United States Patent
Kang et al.

(10) Patent No.: US 8,811,640 B2
(45) Date of Patent: Aug. 19, 2014

(54) APPARATUS AND METHOD FOR TRANSMITTING HUMAN SOUND FOR REMOVING INTERFERENCE SIGNAL

(75) Inventors: Tae Wook Kang, Daejeon (KR); Jung Hwan Hwang, Daejeon (KR); Sung Eun Kim, Seoul (KR); Sung Weon Kang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 291 days.

(21) Appl. No.: 13/488,796

(22) Filed: Jun. 5, 2012

(65) Prior Publication Data

US 2012/0314883 A1    Dec. 13, 2012

(30) Foreign Application Priority Data

Jun. 8, 2011 (KR) .......... 10-2011-0055192
Oct. 4, 2011 (KR) .......... 10-2011-0100562

(51) Int. Cl.
*H04R 25/00* (2006.01)
*H04B 13/00* (2006.01)

(52) U.S. Cl.
CPC .................. *H04B 13/005* (2013.01)
USPC ............ 381/316; 381/315; 381/326; 381/151

(58) Field of Classification Search
USPC .................. 381/151, 326, 315, 316
See application file for complete search history.

(56) References Cited

U.S. PATENT DOCUMENTS

2011/0033068 A1    2/2011    Hwang et al.

FOREIGN PATENT DOCUMENTS

KR    10-0942705 B1    2/2010
KR    10-2011-0013246 A    2/2011

*Primary Examiner* — Creighton Smith

(57) ABSTRACT

Disclosed are an apparatus and a method for transmitting human sound that cancel an interference signal generated by a non-linear property of a human body around an ear by synthesizing and transmitting a sound signal modulated by a single side band (SSB) transmission method and a carrier to one output unit and by synthesizing and transmitting the sound signal modulated by the single side band (SSB) transmission method and a carrier in which a phase of a signal is transited to the other output unit, by using two signal output units in a sound transmitting apparatus.

9 Claims, 4 Drawing Sheets

SYNTHESIS SIGNAL TRANSMITTED THROUGH HUMAN BODY

APPARATUS AND METHOD FOR TRANSMITTING HUMAN SOUND FOR REMOVING INTERFERENCE SIGNAL

CROSS-REFERENCE TO RELATED APPLICATIONS

This application is based on and claims priority from Korean Patent Application Nos. 10-2011-55192, filed on Jun. 8, 2011 and 10-2011-0100562, filed on Oct. 4, 2011, with the Korean Intellectual Property Office, the present disclosure of which is incorporated herein in its entirety by reference.

TECHNICAL FIELD

The present disclosure relates to an apparatus and a method for transmitting human sound using a human body as a communication channel, and more particularly, to an apparatus and a method for transmitting human sound that cancel an interference signal generated by a non-linear property of a human body by synthesizing and transmitting a sound signal modulated by a single side band (SSB) transmission method and a carrier to one output unit and by synthesizing and transmitting the sound signal modulated by the single side band (SSB) transmission method and a carrier in which a phase of a signal is shifted to the other output unit, by using two signal output units in a sound transmitting apparatus.

BACKGROUND

Human sound communication indicates a technology that restores a sound signal without a receiver by removing a "line" for sound transmission by transmitting a high-frequency signal having the sound signal to the human body and using a body of human (that is, human body) instead of a cable.

A transmission apparatus (hereinafter, a human sound transmitting apparatus) based on the human sound communications synthesizes the sound signal and a carrier signal for demodulating the sound signal, and transfers the synthesized signal to human ear through a single human body.

However, in the existing human sound transmitting apparatus, an interference signal is generated in an audible frequency band other than a desired sound signal due to a non-linear phenomenon of the human body at the time when the sound signal is transmitted. Therefore, the sound signal is distorted by the interference signal, such that the quality of a reception signal deteriorates.

SUMMARY

The present disclosure has been made in an effort to provide an apparatus and a method for transmitting human sound that cancel an interference signal generated by a non-linear property of a human body around an ear by synthesizing and transmitting a sound signal modulated by a single side band (SSB) transmission method and a carrier to one output unit and by synthesizing and transmitting the sound signal modulated by the single side band (SSB) transmission method and a carrier in which a phase of a signal is shifted to the other output unit, by using two signal output units in a sound transmitting apparatus.

An exemplary embodiment of the present disclosure provides an apparatus for transmitting human sound, including: a sound signal generating unit configured to generate a sound signal in an audible frequency band; a carrier signal generating unit configured to generate a carrier in a frequency band higher than the audible frequency band; a first signal processing unit configured to modulate the sound signal generated through the sound signal generating unit by a signal side band (SSB) transmission method and synthesize a modulated sound signal and the carrier generated through the carrier signal generating unit to output a synthesized signal to a human body; and a second signal processing unit configured to modulate the sound signal generated through the sound signal generating unit by the single side band (SSB) transmission method and synthesize a modulated sound signal and a phase-shifted carrier acquired by shifting a phase of the carrier generated through the carrier signal generating unit to output a synthesized signal to the human body.

Another exemplary embodiment of the present disclosure provides a method for transmitting human sound, including: generating a sound signal in an audible frequency band; generating a carrier in a frequency band higher than the audible frequency band; modulating the sound signal by a signal side band (SSB) transmission method and synthesizing a modulated sound signal and the carrier to output a first synthesized signal to a human body; and simultaneously with the output, modulating the sound signal by the single side band (SSB) transmission method and synthesizing a modulated sound signal and a phase-shifted carrier acquired by shifting a phase of the carrier to output a second synthesized signal to the human body.

According to the exemplary embodiments of the present disclosure, an apparatus for transmitting high-frequency sound using an existing human body as a communication channel uses two output units, in which one output unit transmits a signal acquired by synthesizing a sound signal and a carrier, and the other output unit transmits a signal acquired by synthesizing the sound signal and a carrier in which a phase is shifted, which is removed, such that the interference signal is cancelled in a sound signal finally transferred to an ear to improve sound quality.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

Figure 1:
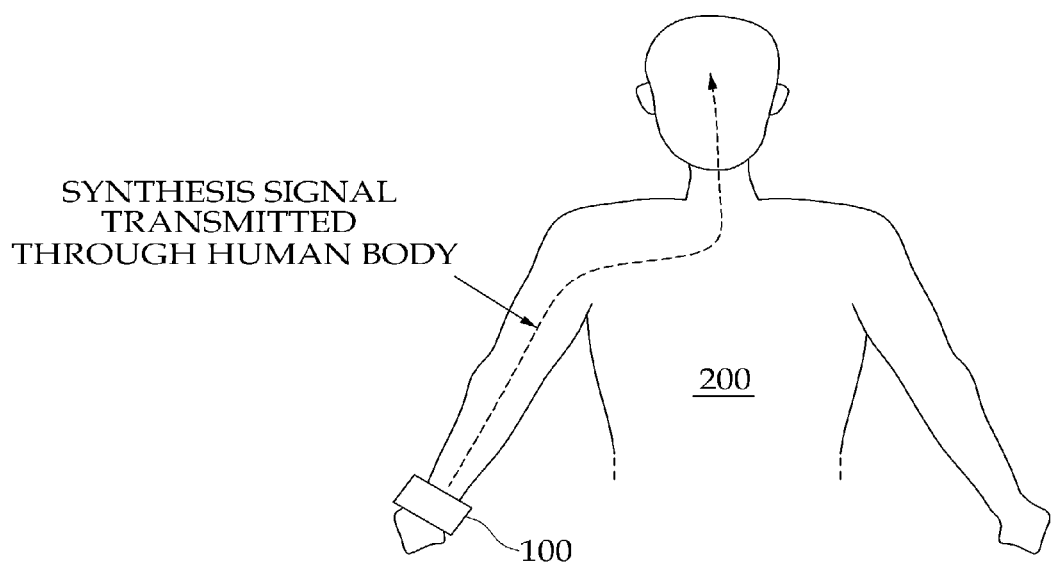
FIG. 1 is a conceptual diagram of an apparatus for transmitting human sound according to an exemplary embodiment of the present disclosure.

In the following detailed description, reference is made to the accompanying drawing, which form a part hereof. The illustrative exemplary embodiments described in the detailed description, drawing, and claims are not meant to be limiting. Other exemplary embodiments may be utilized, and other changes may be made, without departing from the spirit or scope of the subject matter presented here.

Hereinafter, exemplary embodiments of the present disclosure will be described in detail with reference to the accompanying drawings. The configurations of the present disclosure and the resulting operational effects will be apparently appreciated through the detailed description described as below.

Prior to the detailed description of the present disclosure, it should be noted that the same components refer to the same reference numerals anywhere as possible in the drawings and well-known functions or constructions will not be described in detail when it is judged that they may unnecessarily obscure the understanding of the present disclosure. In addition, unless explicitly described to the contrary, the word "comprise" and variations such as "comprises" or "comprising", will be understood to imply the inclusion of stated elements but not the exclusion of any other elements.

FIG. 1 is a conceptual diagram of an apparatus for transmitting human sound according to an exemplary embodiment of the present disclosure.

As shown in FIG. 1, the human sound transmitting apparatus 100 according to the exemplary embodiment of the present disclosure transmits a sound signal by using a human body 200 as a communication channel in contact with or adjacent to the human body 200.

In this case, the human sound transmitting apparatus 100 according to the exemplary embodiment of the present disclosure generates a first synthesis signal acquired by synthesizing the sound signal and a high-frequency carrier signal and a second synthesis signal acquired by synthesizing the sound signal and a high-frequency carrier signal in which a phase of a signal is shifted at the same time, and thereafter, outputs the first synthesis signal and the second synthesis signal to the human body 200.

Then, the first synthesis signal and the second synthesis signal outputted from the human sound transmitting apparatus 100 are transferred through the human body 200, and thereafter, the sound signals thereof are restored by a non-linear property of the human body and in this case, interference is cancelled by carriers in which inter-phases are shifted to be transferred to an ear.

By this configuration, a person contacting the human sound transmitting apparatus 100 or a user of the human sound transmitting apparatus 100 may hear a sound signal demodulated in his/her own ear region without an additional receiving apparatus.

FIG. 1 illustrates as an example a type where the human sound transmitting apparatus 100 is in contact with or adjacent to an arm of the human body, but the human sound transmitting apparatus 100 is not limited thereto, and may operate even at a neck or other body parts.

As such, a principle of cancelling an interference signal generated in an audible frequency band other than the sound signal and restoring and transferring only the sound signal may be defined as follows.

In general, an input/output relationship for a non-linear medium may be defined by Equation 1 below.

[Equation 1]

$$f(x) = a0 + a1x + a2x^2 + \ldots + anx^n \quad (1)$$

According to a method presented in the present disclosure, since a result of a decoded sound signal generated by terms of 4 multiple or less in a human body is not significantly different from a result of a sound signal generated from terms of 5 multiple or more, the non-linear property of the human body is modeled as Equation 2 below for convenience of calculation.

[Equation 2]

$$f(x) = a0 + a1x + a2x^2 + a3x^3 + a4x^4 \quad (2)$$

A signal (that is, a sound signal) of a sound frequency band is modeled as Equation 3 below, $\phi=0$ is assumed for convenience of calculation, and k represents a constant value.

[Equation 3]

$$m(t) = k \cos(2\pi fmt + \phi) \quad (3)$$

A carrier signal of an ultrasonic band is modeled by Equation 4 below.

[Equation 4]

$$c(t) = a \cos(2\pi fct) \quad (4)$$

Herein, q represents a constant value. In this case, a modulated signal transmitted in a top side band in the single side band transmission method may be defined as Equation 5 below.

[Equation 5]

$$mssb(t) = k \cos(2\pi fmt) a \cos(2\pi fct) - k \sin(2\pi fmt) a \cos(2\pi fct) \quad (5)$$

Therefore, when a signal mssb(t)+c(t) acquired by synthesizing a sound signal 5 modulated by Equation 5 above, and a carrier signal 4 is outputted through an ultrasonic device (output unit) to be applied to a human body medium, an output signal below is generated by a non-linear property of the human body medium.

[Equation 6]

$$\begin{aligned}
g(t) &= f(mssb(t) + c(t)) \\
&= \frac{1}{8}(8a0 + 4a2q^2 + 4a2k^2q^2 + 3a4q^4 + 12a4k^2q^4 + 3a4k^4q^4 + \\
&\quad 8a1q\cos[2fc\pi t] + 6a3q^3\cos[2fc\pi t] + 12a3k^2q^3\cos[2fc\pi t] + \\
&\quad 4a2q^2\cos[4fc\pi t] + 4a4q^4\cos[4fc\pi t] + \\
&\quad 12a4k^2q^4\cos[4fc\pi t] + 2a3q^3\cos[6fc\pi t] + a4q^4\cos[8fc\pi t] + \\
&\quad 8a2kq^2\cos[2fm\pi t] + 12a4kq^4\cos[2fm\pi t] + \\
&\quad 12a4k^3q^4\cos[2fm\pi t] + 6a4k^2q^4\cos[4fm\pi t] + \\
&\quad 6a3kq^3\cos[2fc\pi t - 2fn\pi t] + 4a4kq^4\cos[4fc\pi t - 2fn\pi t] + \\
&\quad 8a1kq\cos[2fc\pi t + 2fm\pi t] + 12a3kq^3\cos[2fc\pi t + 2fm\pi t] + \\
&\quad 6a3k^3q^3\cos[2fc\pi t + 2fn\pi t] + 8a2kq^2\cos[4fc\pi t + 2fm\pi t] + \\
&\quad 12a4kq^4\cos[4fc\pi t + 2fm\pi t] + 12a4k^3q^4\cos[4fc\pi t + 2fm\pi t] + \\
&\quad 6a3kq^3\cos[6fc\pi t + 2fm\pi t] + 4a4kq^4\cos[8fc\pi t + 2fm\pi t] + \\
&\quad 6a3k^2q^3\cos[2fc\pi t + 4fm\pi t] + 4a2k^2q^2\cos[4fc\pi t + 4fm\pi t] + \\
&\quad 12a4k^2q^4\cos[4fc\pi t + 4fm\pi t] + 4a4k^4q^4\cos[4fc\pi t + 4fm\pi t] + \\
&\quad 6a3k^2q^3\cos[6fc\pi t + 4fm\pi t] + 6a4k^2q^4\cos[8fc\pi t + 4fm\pi t] + \\
&\quad 4a4k^3q^4\cos[4fc\pi t + 6fm\pi t] + 2a3k^3q^3\cos[6fc\pi t + 6fm\pi t] + \\
&\quad 4a4k^3q^4\cos[8fc\pi t + 6fm\pi t] + a4k^4q^4\cos[8fc\pi t + 8fm\pi t])
\end{aligned}$$

A desired sound signal in the output signal illustrated in Equation 6 above may be defined as terms of 8 a2 k q² Cos [2 πt]+12 a4 k q⁴ Cos [2 fm π t]+12 a4 k³ q⁴ Cos [2 fm π t], and a term of 6a4 k² q⁴ Cos [4 fm π t] may be defined as an interference signal that is provided in a sound signal band. The rest of the terms as signals in an ultrasonic band are signals in a frequency band which human may not hear with his/her ear.

In this case, a phase of the carrier signal 4 in the ultrasonic band is shifted to a value between −180° to 180°. For example, when the shifted phase is −90° or 90°, the phase is illustrated in Equation 7.

[Equation 7]

$$c'(t) = a \sin(2\pi fct) \text{ or } -a \sin(2\pi fct) \quad (7)$$

Result values for a desired sound signal are the same as each other even though the phase of the carrier signal is shifted to −90° or 90°, and thus when a synthesis signal mssb(t)+c'(t) for the case where the phase is shifted to 90° is outputted to be applied to the human body medium, the output signal by the non-linear property of the human body medium is illustrated in Equation 8 below.

In this case, mssb(t)+c'(t) becomes a signal acquired by combining the modulated sound signal 5 and a carrier signal 7 in which the phase is shifted to −90° or 90°.

[Equation 8]

$$\begin{aligned}
h(t) &= f(mssb(t) + c(t)) \\
&= \frac{1}{8}(8a0 + 4a2q^2 + 4a2k^2q^2 + 3a4q^4 + 12a4k^2q^4 + \\
&\quad 3a4k^4q^4 - 4a2q^2\text{Cos}[4fc\pi t] - 4a4q^4\text{Cos}[4fc\pi t] - \\
&\quad 12a4k^2q^4\text{Cos}[4fc\pi t] + a4q^4\text{Cos}[8fc\pi t] - \\
&\quad 6a4k^2q^4\text{Cos}[4fm\pi t] - 6a3kq^3\text{Cos}[2fc\pi t - 2fm\pi t] + \\
&\quad 8a1kq\text{Cos}[2fc\pi t + 2fm\pi t] + 12a3kq^3\text{Cos}[2fc\pi t + 2fm\pi t] + \\
&\quad 6a3k^3q^3\text{Cos}[2fc\pi t + 2fm\pi t] - 6a3kq^3\text{Cos}[6fc\pi t + 2fm\pi t] + \\
&\quad 4a2k^2q^2\text{Cos}[4fc\pi t + 4fm\pi t] + 12a4k^2q^4\text{Cos}[4fc\pi t + 4fm\pi t] + \\
&\quad 4a4k^4q^4\text{Cos}[4fc\pi t + 4fm\pi t] - 6a4k^2q^4\text{Cos}[8fc\pi t + 4fm\pi t] + \\
&\quad 2a3k^3q^3\text{Cos}[6fc\pi t + 6fm\pi t] + a4k^4q^4\text{Cos}[8fc\pi t + 8fm\pi t] - \\
&\quad 8a1q\text{Sin}[2fc\pi t] - 6a3q^3\text{Sin}[2fc\pi t] - 12a3k^2q^3\text{Sin}[2fc\pi t] + \\
&\quad 2a3q^3\text{Sin}(6fc\pi t] + 8a2kq^2\text{Sin}[2fm\pi t] + 12a4kq^4\text{Sin}[2fm\pi t] + \\
&\quad 12a4k^3q^4\text{Sin}[2fm\pi t] + 4a4kq^4\text{Sin}[4fc\pi t - 2fm\pi t] - \\
&\quad 8a2kq^2\text{Sin}[4fc\pi t + 2fm\pi t] - 12a4kq^4\text{Sin}[4fc\pi t + 2fm\pi t] - \\
&\quad 12a4k^3q^4\text{Sin}[4fc\pi t + 2fm\pi t] + 4a4kq^4\text{Sin}[8fc\pi t + 2fm\pi t] + \\
&\quad 6a3k^2q^3\text{Sin}[2fc\pi t + 4fm\pi t] - 6a3k^2q^3\text{Sin}(6fc\pi t + 4fm\pi t] + \\
&\quad 4a4k^3q^4\text{Sin}[4fc\pi t + 6fm\pi t] - 4a4k^3q^4\text{Sin}[8fc\pi t + 6fm\pi t])
\end{aligned}$$

As such, desired sound signals in an output signal illustrated in Equation 8 are terms of 8 a2 k q² Sin [2 fm π t]+12 a4 k q⁴ Sin [2 fm π t]+12 a4 k³ q⁴ Sin [2 fm π t], and a term for the interference signal corresponds to −6 a4 k² q⁴ Cos [4 fm π t].

In this case, when mssb(t)+c(t) and mssb(t)+c'(t) are outputted to each ultrasonic device by using two ultrasonic devices (output units) to be applied to the human body, the synthesis signals are calculated as illustrated in Equation 9 below.

[Equation 9]

$$\begin{aligned}
g(t) + h(t) &= f(mssb(t) + c(t)) + f(mssb(t) + c'(t)) \\
&= \frac{1}{4}(8a0 + 4a2q^2 + 4a2k^2q^2 + 3a4q^4 + 12a4k^2q^4 + \\
&\quad 3a4k^4q^4 + 4a1q\text{Cos}[2fc\pi t] + 3a3q^3\text{Cos}[2fc\pi t] + \\
&\quad 6a3k^2q^3\text{Cos}[2fc\pi t] + a3q^3\text{Cos}[6fc\pi t] + \\
&\quad a4q^4\text{Cos}[8fc\pi t] + 4a2kq^2\text{Cos}[2fm\pi t] + \\
&\quad 6a4kq^4\text{Cos}[2fm\pi t] + 6a4k^3q^4\text{Cos}[2fm\pi t] + \\
&\quad 2a4kq^4\text{Cos}[4fc\pi t - 2fm\pi t] + 8a1kq\text{Cos} \\
&\quad [2fc\pi t + 2fm\pi t] + 12a3kq^3\text{Cos}[2fc\pi t + 2fm\pi t] + \\
&\quad 6a3k^3q^3\text{Cos}[2fc\pi t + 2fm\pi t] + 4a2kq^2\text{Cos} \\
&\quad [4fc\pi t + 2fm\pi t] + 6a4kq^4\text{Cos}[4fc\pi t + 2fm\pi t] + \\
&\quad 6a4k^3q^4\text{Cos}[4fc\pi t + 2fm\pi t] + 2a4kq^4\text{Cos} \\
&\quad [8fc\pi t + 2fm\pi t] + 3a3k^2q^3\text{Cos}[2fc\pi t + 4fm\pi t] + \\
&\quad 4a2k^2q^2\text{Cos}[4fc\pi t + 4fm\pi t] + \\
&\quad 12a4k^2q^4\text{Cos}[4fc\pi t + 4fm\pi t] + 4a4k^4q^4\text{Cos} \\
&\quad [4fc\pi t + 4fm\pi t] + 3a3k^2q^3\text{Cos}[6fc\pi t + 4fm\pi t] + \\
&\quad 2a4k^3q^4\text{Cos}[4fc\pi t + 6fm\pi t] + 2a3k^3q^3\text{Cos} \\
&\quad [6fc\pi t + 6fm\pi t] + 2a4k^3q^4\text{Cos}[8fc\pi t + 6fm\pi t] + \\
&\quad a4k^4q^4\text{Cos}[8fc\pi t + 8fm\pi t] - 4a1q\text{Sin}[2fc\pi t] - \\
&\quad 3a3q^3\text{Sin}[2fc\pi t] - 6a3k^2q^3\text{Sin}[2fc\pi t] + \\
&\quad a3q^3\text{Sin}[6fc\pi t] + 4a2kq^2\text{Sin}[2fm\pi t] + \\
&\quad 6a4kq^4\text{Sin}[2fm\pi t] + 6a4k^3q^4\text{Sin}[2fm\pi t] + \\
&\quad 2a4kq^4\text{Sin}[4fc\pi t - 2fm\pi t] - 4a2kq^2\text{Sin} \\
&\quad [4fc\pi t + 2fm\pi t] - 6a4kq^4\text{Sin}[4fc\pi t + 2fm\pi t] - \\
&\quad 6a4k^3q^4\text{Sin}[4fc\pi t + 2fm\pi t] + 2a4kq^4\text{Sin} \\
&\quad [8fc\pi t + 2fm\pi t] + 3a3k^2q^3\text{Sin}[2fc\pi t + 4fm\pi t] - \\
&\quad 3a3k^2q^3\text{Sin}[6fc\pi t + 4fm\pi t] + 2a4k^3q^4\text{Sin} \\
&\quad [4fc\pi t + 6fm\pi t] - 2a4k^3q^4\text{Sin}[8fc\pi t + 6fm\pi t])
\end{aligned}$$

As seen in Equation 9 above, it may be verified that a term corresponding to the interference signal is removed. Accordingly, an interference signal in an audible frequency band generated by the non-linear property of the human body medium may be effectively removed by the method.

Hereinafter, a configuration for implementing the method will be described in detail.

Figure 2:
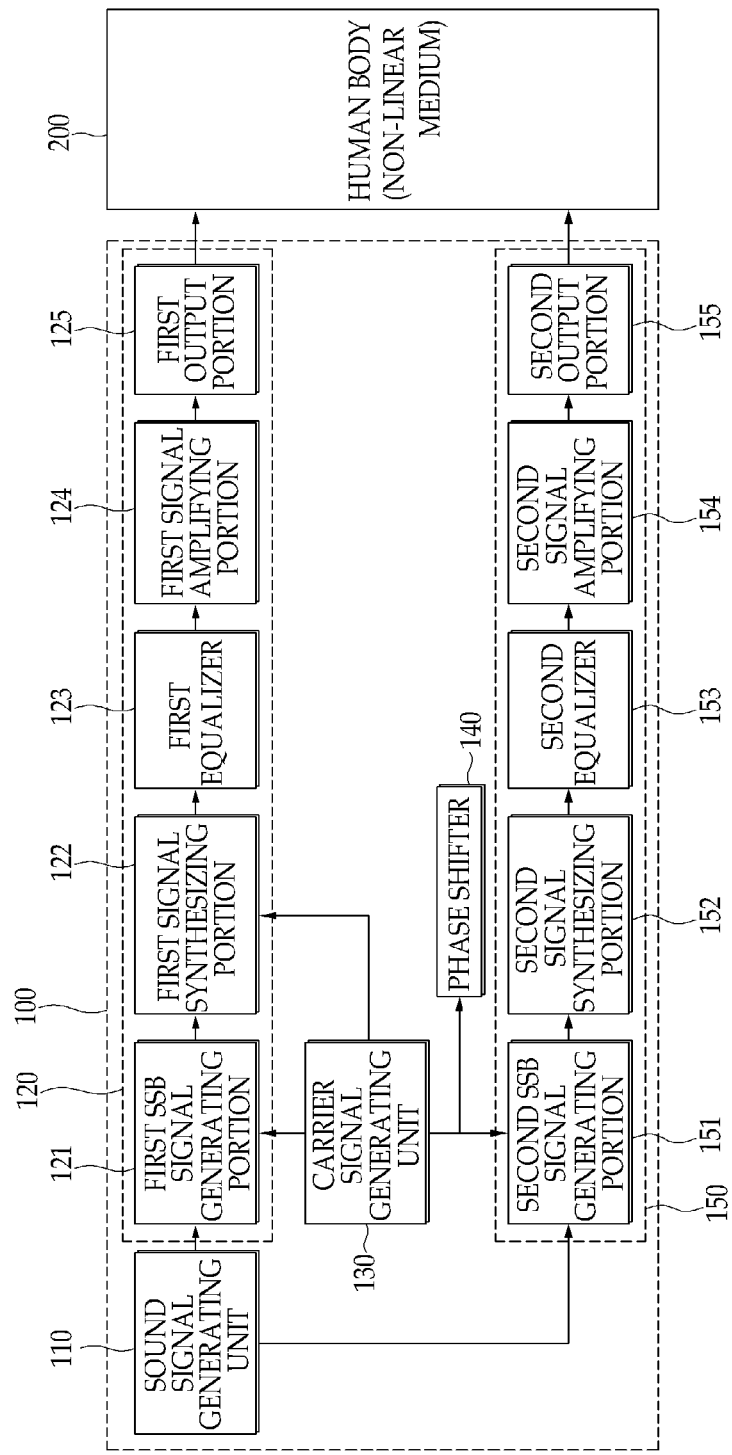
FIG. 2 is a configuration diagram of an apparatus for transmitting human sound according to an exemplary embodiment of the present disclosure.

FIG. 2 is a configuration diagram of an apparatus for transmitting human sound according to an exemplary embodiment of the present disclosure.

Referring to FIG. 2, the human sound transmitting apparatus 100 according to the exemplary embodiment of the present disclosure includes a sound signal generating unit 110, a first signal processing unit 120, a carrier signal generating unit 130, a phase shifter 140 and a second signal processing unit 150.

The sound signal generating unit 110 extracts data having information to be transmitted through the human body, from data stored in the sound transmitting apparatus 100, and thereafter converts the extracted data into the sound signal in the audible frequency band. Further, as necessary, the sound signal generating unit 110 may generate a sound signal by receiving data from an external communication apparatus.

The sound signal generating unit 110 transfers the generated sound signal to the first signal processing unit 120 and the second signal processing unit 150.

The carrier signal generating unit 130 generates a high-frequency carrier signal having a higher frequency than a human audible frequency band (up to 20 KHz). In this case, a frequency of the high-frequency carrier signal as a signal for carrying the sound signal may vary depending on a frequency of a sound signal to be transferred and an impedance of the human body 200.

The phase shifter 140 shifts the phase of the carrier signal generated by the carrier signal generating unit 130.

The first signal processing unit 120 receives and modulates the sound signal generated by the sound signal generating unit 110 and the carrier signal generated by the carrier signal generating unit 130, and synthesizes the modulated sound signal and the carrier signal generated by the carrier signal generating unit 130 to output the synthesized signal to the human body 200.

Like the first signal processing unit 120, the second signal processing unit 150 receives and modulates the sound signal generated by the sound signal generating unit 110 and the carrier signal generated by the carrier signal generating unit 130, and synthesizes the modulated sound signal and the carrier signal of which the phase is shifted by the phase shifter 140 to output the synthesized signal to the human body 200.

To this end, the first signal processing unit 120 and the second signal processing unit 150 include first and second SSB signal generating portions 121 and 151, first and second signal synthesizing portions 122 and 152, first and second equalizers 123 and 153, first and second signal amplifying portions 124 and 154 and first and second output portions 125 and 155, respectively.

The first and second SSB signal generating portions 121 and 151 modulate the sound signal generated through the sound signal generating unit 110 according to the single side band (SSB) method together with the carrier signal generated by the carrier signal generating unit 130 to generate the modulated sound signal. In this case, in the SSB modulation method, the sound signal may be generated by using the phase shifter or may be generated by using the double side band (DSB) transmission method and removing the lower side band or the upper side band through a filter.

The first signal synthesizing portion 122 synthesizes the sound signal modulated through the first SSB signal generating portion 121 and the carrier signal generated through the carrier signal generating unit 130 to generate a first synthesis signal.

The second signal synthesizing portion 152 synthesizes the sound signal modulated through the second SSB signal generating portion 151 and the carrier signal of which a phase is shifted through the phase shifter 140 to generate a second synthesis signal.

The first and second equalizers 123 and 153 compensate signals distorted by ultrasonic output characteristics in the first synthesis signal and the second synthesis signal generated from the first signal synthesizing portion 122 and the second signal synthesizing portion 152, respectively.

The first and second signal amplifying portions 124 and 154 amplify the first synthesis signal and the second synthesis signal generated from the first signal synthesizing portion 122 and the second signal synthesizing portion 152 to apply the amplified signals to the first and second output portions 125 and 155, respectively. In this case, the first synthesis signal and the second synthesis signal may be signals distortion-compensated through the equalizers 123 and 153, respectively, but may be applied directly from the signal synthesizing portions 122 and 152, respectively.

The first and second output portions 125 and 155 are implemented by additional ultrasonic devices to output the first synthesis signal and the second synthesis signal, which are signal-amplified, to the human body 200 through the respective ultrasonic devices, respectively.

Then, the first synthesis signal and the second synthesis signal outputted through the first and second output portions 125 and 155 are transferred to the vicinity of the ear through the human body medium and in this case, the interference signals generated by the non-linear characteristic of the human body medium are inter-cancelled by two carrier signals of which phases are shifted.

Figure 3:
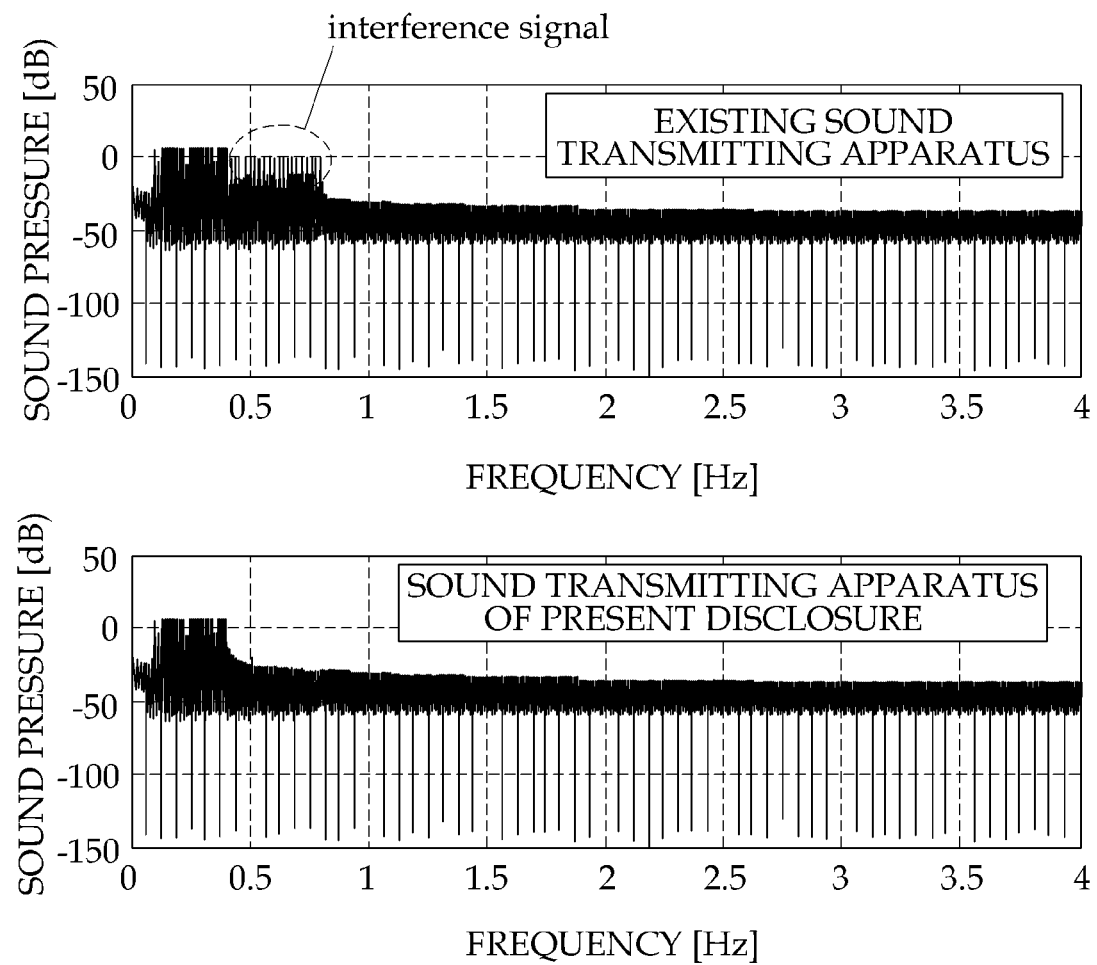
FIG. 3 is a graph illustrating an experimental result in which an interference signal is removed through the human sound transmitting apparatus according to the exemplary embodiment of the present disclosure.

FIG. 3 is a graph illustrating an experimental result in which an interference signal is removed through the human sound transmitting apparatus according to the exemplary embodiment of the present disclosure.

A waveform illustrated in FIG. 3 refers to a sound signal decoded by the non-linear property of the human body medium. The frequency of the carrier signal is determined as 40 KHz, and the sound signal is inputted as 1 KHz to 4 KHz (a signal sample interval of 100 Hz) which is a signal in a predetermine audible frequency band. In this case, the phase shifter 140 shifts the phase of the carrier to 90°.

As the experimental result, it can be seen that, in an existing sound transmitting apparatus that does not adopt the presented method, an undesired interference signal is generated in a band in the range of 2 to 8 KHz as illustrated in Equation 6, such that sound signals in a band in the range of 2 to 4 KHz are overlapped with each other to be distorted.

It can be verified that, in the sound transmitting apparatus adopting the presented method, since the interference signal is removed based on Equation 9, the signal in the band in the range of 1 to 4 KHz is not distorted, and the quality of a received signal is maintained.

Figure 4:
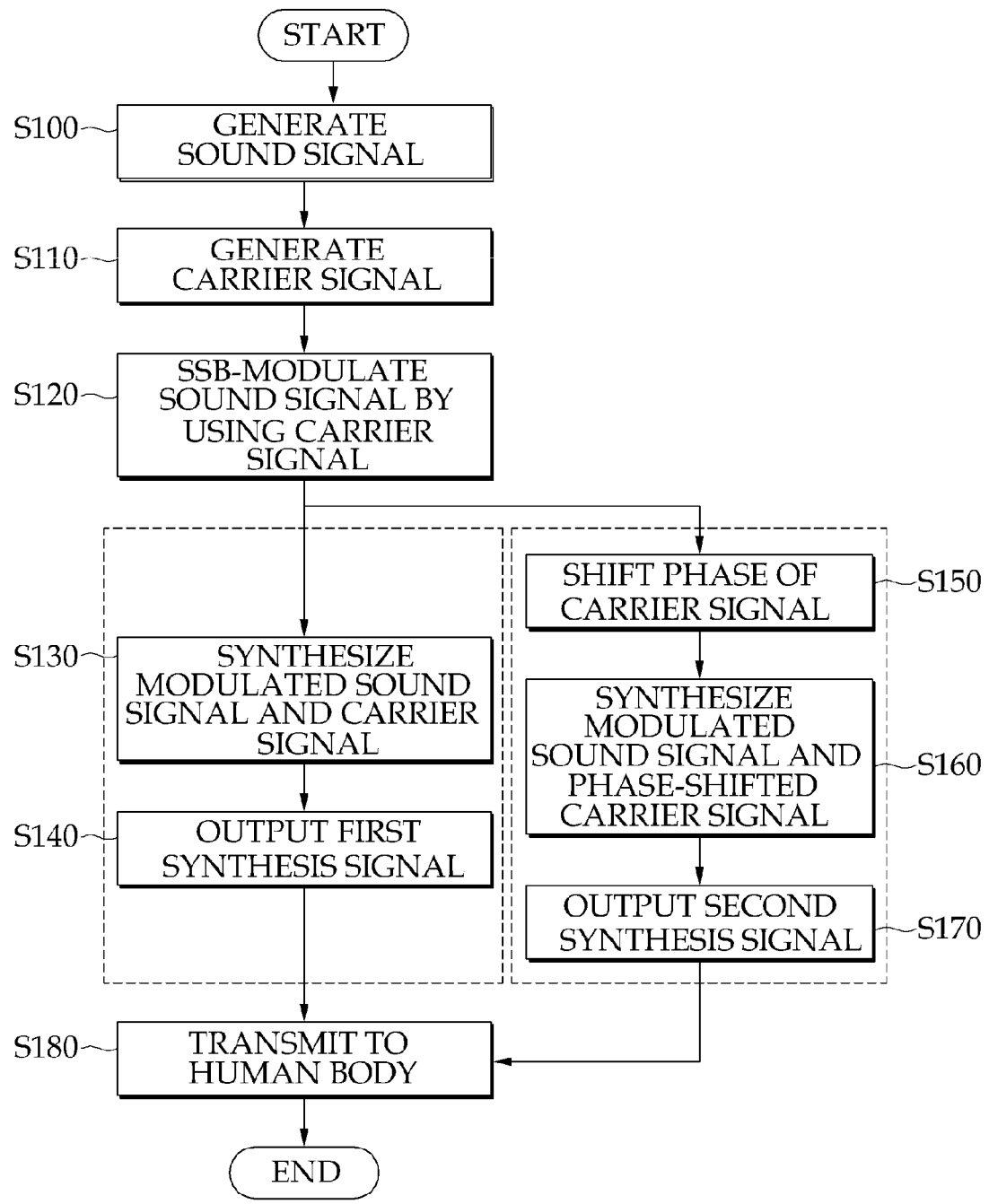
FIG. 4 is a flowchart explaining a method for transmitting human sound for removing an interference signal according to an exemplary embodiment of the present disclosure.

FIG. 4 is a flowchart explaining a method for transmitting human sound for removing an interference signal according to an exemplary embodiment of the present disclosure. For easy description, the human sound transmitting method will be described in association with the constituent members of FIG. 2.

First, in the sound transmitting apparatus, the sound signal generating unit 110 generates a sound signal in an audible frequency band and the carrier signal generating unit 130 generates a high-frequency carrier signal higher than the audible frequency band (S100 and S110).

Thereafter, the sound signal generated by the sound signal generating unit 110 using the carrier signal is modulated by a single side band (SSB) transmission method (S120).

Thereafter, the sound transmitting apparatus synthesizes the sound signal SSB-modulated by the first signal processing unit 120 and the carrier signal generated by the carrier signal generating unit 130 (S130).

Thereafter, a first synthesis signal synthesized is outputted through the first output portion 125 (S140).

With the output, the sound transmitting apparatus shifts a phase of the carrier signal generated by the carrier signal generating unit 130 through the phase shifter 140, and applies the phase-shifted signal to the second signal processing unit 150 (S150).

Then, the second signal processing unit 150 synthesizes the carrier signal applied from the phase shifter 140, that is, the phase-shifted carrier signal and the SSB-modulated sound signal (S160).

Thereafter, the second signal processing unit 150 outputs a second synthesis signal synthesized through the second output portion 155 (S170).

Thereafter, the synthesis signals outputted from the respective output portions, that is, the first output portion 125 and the second output portion 155 are transmitted by using a human body as a medium (S180).

In this case, steps S140 and S170 of outputting the first synthesis signal and the second synthesis signal that are synthesized may further include a step of compensating distortion generated of an output characteristic of a signal and a step of amplifying the compensated signal.

Alternatively, the signal may be outputted through only the step of amplifying the first synthesis signal and the second synthesis signal without the compensation step.

Through the process, the interference signal generated by the non-linear characteristic of the human body is cancelled within the human body and only the sound signal reaches ears, and as a result, a user may effectively transfer a sound signal to be transferred to human ear.

The method according to the exemplary embodiment of the present disclosure is implemented by programs to be stored in computer-readable media (a CD-ROM, a RAM, a ROM, a floppy disk, a hard disk, and an optical magnetic disk). Since the process can be easily performed by those skilled in the art, the process will not be described in detail any more.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An apparatus for transmitting human sound, comprising:
   a sound signal generating unit configured to generate a sound signal in an audible frequency band;
   a carrier signal generating unit configured to generate a carrier in a frequency band higher than the audible frequency band;
   a first signal processing unit configured to modulate the sound signal generated through the sound signal generating unit by a signal side band (SSB) transmission method, and synthesize a modulated sound signal and the carrier generated through the carrier signal generating unit to output a synthesized signal to a human body; and
   a second signal processing unit configured to modulate the sound signal generated through the sound signal generating unit by the single side band (SSB) transmission method, and synthesize a modulated sound signal and a phase-shifted carrier acquired by shifting a phase of the carrier generated through the carrier signal generating unit to output a synthesized signal to the human body.

2. The apparatus for transmitting human sound of claim 1, further comprising:
   a phase shifter configured to shift the phase of the carrier generated through the carrier signal generating unit to 90° or −90°.

3. The apparatus for transmitting human sound of claim 1, wherein the first signal processing unit includes:
   an SSB signal generating portion configured to modulate the sound signal generated through the sound signal generating unit according to the SSB transmission method by using the carrier generated through the carrier signal generating unit and generate the modulated sound signal;
   a signal synthesizing portion configured to synthesize the sound signal modulated through the SSB signal generating portion and the carrier; and
   an output portion configured to output a signal synthesized through the signal synthesizing portion.

4. The apparatus for transmitting human sound of claim 1, wherein the second signal processing unit includes:
   an SSB signal generating portion configured to modulate the sound signal generated through the sound signal generating unit according to the SSB transmission method by using the carrier generated through the carrier signal generating unit and generate the modulated sound signal;
   a signal synthesizing portion configured to synthesize the sound signal modulated through the SSB signal generating portion and the phase-shifted carrier; and
   an output portion configured to output a signal synthesized through the signal synthesizing portion.

5. The apparatus for transmitting human sound of claim 3, further comprising:
   an equalizer configured to compensate distortion generated from an output characteristic of a signal outputted from the signal synthesizing portion; and
   a signal amplifying portion configured to amplify a signal compensated by the equalizer or the signal synthesized through the signal synthesizing portion and transfer an amplified signal to the output portion.

6. The apparatus for transmitting human sound of claim 4, further comprising:
   an equalizer configured to compensate distortion generated from an output characteristic of a signal outputted from the signal synthesizing portion; and
   a signal amplifying portion configured to amplify a signal compensated by the equalizer or the signal synthesized through the signal synthesizing portion and transfer an amplified signal to the output portion.

7. A method for transmitting human sound, comprising:
   generating a sound signal in an audible frequency band;
   generating a carrier in a frequency band higher than the audible frequency band;
   modulating the sound signal by a signal side band (SSB) transmission method and synthesizing a modulated sound signal and the carrier to output a first synthesized signal to a human body; and
   simultaneously with the output, modulating the sound signal by the single side band (SSB) transmission method and synthesizing a modulated sound signal and a phase-shifted carrier acquired by shifting a phase of the carrier to output a second synthesized signal to the human body.

8. The method for transmitting human sound of claim 6, wherein the step synthesizing the modulated sound signal and the phase-shifted carrier further includes shifting the phase of the carrier to 90° or −90°, before synthesizing, so that the carriers of the first synthesized signal and the second synthesized signalare inter-cancelled.

9. The method for transmitting human sound of claim 6, wherein before the outputting of the first synthesized signal and the second synthesized signal further include:
   compensting distortion generated from the output characteristic of the first synthesized signal or the second synthesized signal; and
   amplifying a signal in which the distortion is compensated.

* * * * *